Oct. 1, 1929. J. E. MUHLFELD Re. 17,449

BAFFLE WALL

Original Filed Oct. 26, 1920 2 Sheets-Sheet 1

INVENTOR
John E. Muhlfeld
BY
C. P. Zepel
his ATTORNEY

Oct. 1, 1929. J. E. MUHLFELD Re. 17,449

BAFFLE WALL

Original Filed Oct. 26, 1920 2 Sheets-Sheet 2

INVENTOR
John E. Muhlfeld
BY
C. P. Goepel
his ATTORNEY

BEST AVAILABLE COPY

Reissued Oct. 1, 1929

Re. 17,449

UNITED STATES PATENT OFFICE

JOHN E. MUHLFELD, OF SCARSDALE, NEW YORK

BAFFLE WALL

Original No. 1,622,288, dated March 29, 1927, Serial No. 419,621, filed October 26, 1920. Application for reissue filed September 18, 1928. Serial No. 306,675.

This invention relates to baffle walls, and more particularly to arch walls for the fire boxes of steam locomotives, such, for instance as is shown and described in Patent No. 1,340,907, granted to me on May 5, 1920.

It will be observed upon reference to my issued patent that the furnace arch is made up of a multiplicity of units or bricks of refractory material. These bricks are arranged upon and suspended between the spaced water tubes extending through the combustion chamber and between the outermost tubes of the series and the inner side sheets of the furnace water legs. The outermost rows of baffle bricks in the arch wall are differently formed or constructed at one of their ends from the intermediate bricks of the wall in order to provide for the proper engagement of the bricks in the outer side rows with the sheets of the water legs, or with suitable supporting means fixed thereto. It is, therefore, apparent that in the molding of the refractory baffle bricks or units it is necessary to have separate patterns for the middle or intermediate bricks of the arch wall, and for the bricks which constitute the outer sides of the wall.

It is the primary object and purpose of my present invention to provide a baffle brick or unit construction for use in furnace arch walls which will enable the same mold pattern to be used for the outer rows as well as the intermediate rows of bricks constituting the wall structure so that the total number of brick patterns which it is necessary to keep in stock at the railway storehouses may be substantially reduced by 50%.

I have found in actual practice that an arch wall having all the advantageous features of the wall as disclosed in my issued patent may be produced with all of the bricks of identically the same form and construction by resorting to a very simple change in the formation of the brick or unit, whereby they may be arranged in a substantially continuous completely closed arch wall extending entirely across the combustion chamber of the furnace between opposite side sheets, and suspended between said sheets and the spaced series of water circulating tubes. Since I am thereby enabled to reduce the necessary number of brick patterns as above explained, it is apparent that the cost of production of the baffle bricks or units will also be appreciably reduced.

With the above and other objects in view, the invention consists in the improved construction of the baffle brick or unit, as will be hereinafter more fully described, illustrated in the accompanying drawings, and subsequently incorporated in the subjoined claims.

In the drawings, wherein I have illustrated one satisfactory and practical embodiment of the invention, and in which similar reference characters designate corresponding parts throughout the several views.

Figure 1:
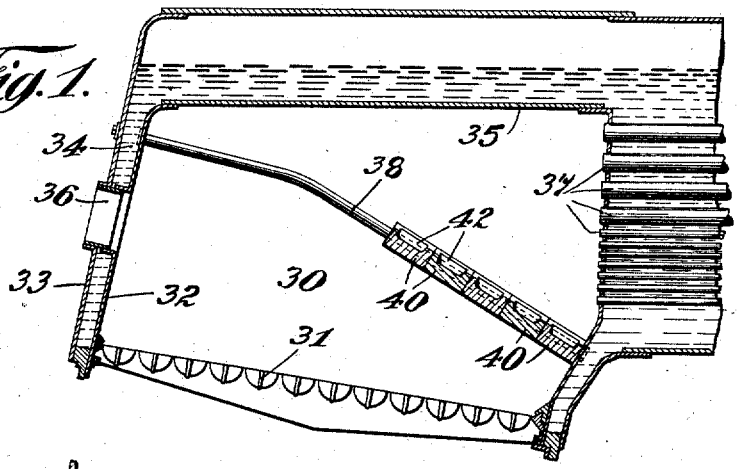
Figure 1 is a longitudinal sectional view through the fire box of a locomotive furnace, showing a baffle or arch wall in which the present improvement is incorporated.
Figure 2:
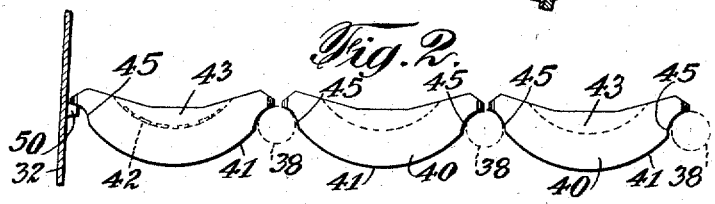
Figure 2 is a partial transverse section through the water circulating tubes and the inner side sheets of the furnace water legs, illustrating the manner of arranging or suspending the baffle bricks or units.

Referring in detail to the drawings, wherein I have illustrated a conventional type of locomotive furnace, 30 designates the combustion chamber and fire box of the furnace, which is provided with the usual grate 31. The furnace of the customary double wall construction is provided with water legs having inner and outer side sheets 32 and 33 respectively, the water legs being extended across the front of the furnace, as at 34, and the inner sheets connected by the crown plate 35. The front wall of the furnace structure is provided with the usual opening 36, through which the fuel is fed. Flues or fire tubes 37 are mounted in the rear end wall of the furnace in communication with the combustion chamber, and extend through the water space of the boiler. In addition to these tubes 37 a series of transversely spaced water tubes 38 connect the front and rear walls of the furnace structure, and are inclined downwardly from the front to the rear wall so that the water as it is heated flows upwardly through these tubes from the rear to the front end of the combustion chamber.

In the present illustration I have shown three of the tubes 38, though any desired number of said tubes may be provided.

Figure 4:
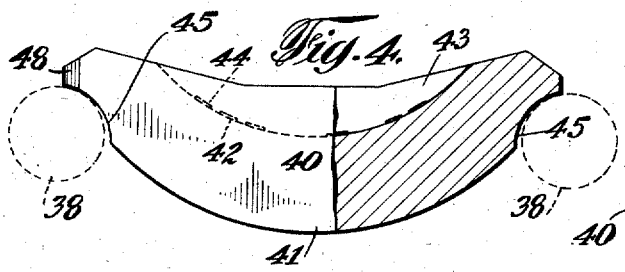
Figure 4 is an enlarged side elevation, partly in section, of one of the baffle bricks.
Figure 5:
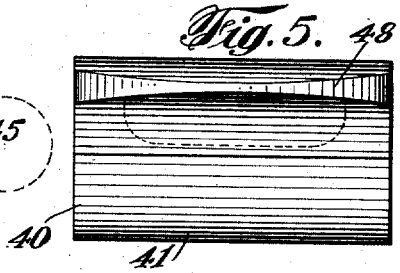
Figure 5 is an end elevation of the brick.

The bricks or units 40 constituting the arch wall which is suspended from the tubes 38 are formed of refractory material. Preferably, these bricks have the configuration illustrated in Figure 4 of the drawings, and are produced from the refractory material, while in a plastic condition, by means of a suitable mold. Thus each of the bricks is provided with a convex lower face 41, which, when the bricks are arranged in assembled position upon the tubes 38, has its intermediate portion disposed below the plane of the lowest surfaces of the tubes. The upper face of each brick is preferably, though not necessarily, recessed, as at 42. The longitudinal side portions of the bricks for substantially the length of the recess or cavity 42 are of increased width to provide reinforcing ribs or flanges 43 which constitute the opposite side walls of said cavity. Upon the surface of the recess or cavity 42 suitable indicia 44 is molded in the formation of the brick, such indicia denoting the type and size of the brick in accordance with a legendary table upon which the different brick sizes are tabulated. It will be seen that the ribs or flanges 43 protect this indicia from wear, and possible obliteration when the bricks are piled upon each other for shipment. While I have found this feature to be one of considerable practical convenience, it is, nevertheless, to be understood that the provision of such indicia may be dispensed with, and that the brick need not necessarily be provided with the side flanges 43.

Each of two opposite edges of the brick 40 is provided with a transversely extending seat 45 in the convex face 41, said seating surface being arcuately curved longitudinally of the brick upon a radius which is somewhat greater than the radius of the water tube 38. It will thus be apparent that when the brick is arranged in suspended relation to the tube, the seating face 45 thereof will have a single point of tangential contact upon the periphery of the tube intermediate of the upper and lower edges of the seating surface.

Each edge face of the brick beyond the seating surface 45 is convexly curved, as at 48, the radius of this curved edge face, the seat 45 and tube 38 having such relation to each other that when one edge of the brick is engaged upon the upper side of one of the tubes 38 the bottom face of the brick will have contact upon the periphery of the tube across the entire width of the brick.

To the inner side sheets 32 of the water legs the spaced cylindrical supporting trunnions 50 are fixed, preferably by electrically welding said trunnions to the metal sheets.

In assembling the baffle bricks or units to produce the furnace arch, the outer longitudinally extending rows of bricks are arranged with their seating surfaces 45 engaged upon the upper portions of the outer tubes 38 at one side of the tube centers. The other edges of these bricks in the outer rows are supported by the trunnions 50, the concave seating faces 45 at one end of the bricks in this outer row contacting upon the ends of the trunnions at the upper sides thereof, the faces 45 extending inwardly and downwardly from the ends of the trunnions to the convex bottom faces 41 of the bricks.

As is well known in such locomotive furnace structures, the side sheets 32 of the water legs are inclined both vertically and longitudinally, and have their upper portions curved inwardly to meet the crown sheet 35. However, by providing the bricks 40 with the transversely convex edge faces 48 these edge faces will substantially clear the inner faces of the side sheets of the water legs so that the bricks may be easily fitted in place or removed. The concave edge faces 45 of the brick prevent the pocketing of the products of combustion adjacent to the furnace sides and the supporting trunnions below the brick and serve to direct such products either downwardly in part into the combustion chamber, or to permit them to pass upwardly between the furnace sides and the brick ends thereby obviating the possibility of slag formation, the deterioration of the brick or of the furnace sides by concentrated excessive heating thereof.

The inner or intermediate rows of bricks are arranged in suspended relation between the adjacent tubes 38 with the convex edge faces 48 of the bricks in each of the rows opposed to the convex end faces of the bricks in an adjacent row, which are engaged upon the same water tube. The convex edge faces of the bricks in adjacent rows do not, however, contact with each other, and the bricks are at all times free and independent, so that they can be separately removed and replaced at any time. As the construction of the two opposite brick edges is identical, either edge of the bricks of the outer rows can be engaged with the supporting trunnions on the water legs, and loss of time in fitting or assembling the outer rows of bricks

BEST AVAILABLE COPY in place is thereby obviated. Thus it will be apparent that with a brick of this particular construction either edge of the brick may be properly positioned upon the water tubes 38 or upon the trunnions 50 so as to produce a substantially completely closed arch wall between the water legs. Therefore, in the production of a furnace arch of the type disclosed in my issued patent the same brick pattern can be used for the mold of the bricks in the side rows, as well as the bricks for the intermediate rows of the wall. Of course it is understood that the bricks may be produced in various lengths and widths, and in the construction of the wall in many cases it is necessary to use bricks of relatively short length in the outer side rows since the distance between the sheets 32 of the water legs and the outer tubes 38 is less than the distance between the adjacent water tubes.

However, even when the side brick are of different dimensions from the intermediate brick of the arch, since the means provided for engagement with the water tubes and the trunnions or lugs on the side sheets permits of the arrangement of the side brick between said lugs and the water tubes regardless of the non-parallel relation between the side arch tubes and the side sheets of the firebox, it is apparent that the corresponding brick at the right and left hand sides of the arch may be interchangeably used so that it is not necessary to make two differently shaped brick, one for the right and the other for the left side of the arch wall.

Figure 3:
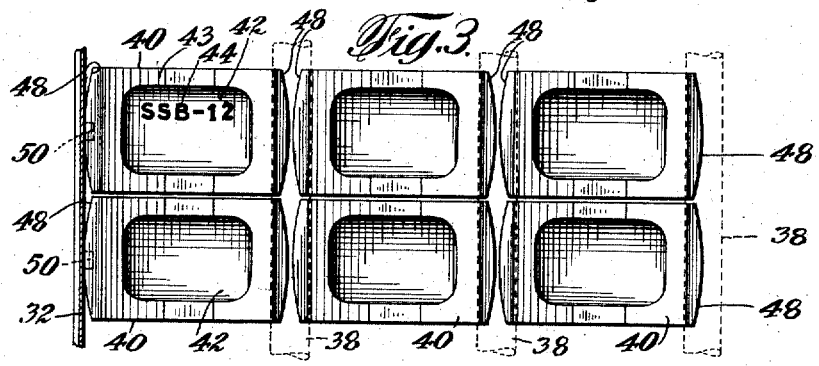
Figure 3 is a top plan view of a portion of the baffle wall.

In this description, I have used the generic term "edge" with reference to the parts of the brick which are provided with the concave grooves or seats 45, and it will be understood that these grooves will be formed in either the side or end edges of the brick considered as an individual unit, depending upon the dimensions thereof. As illustrated in Figure 3 of the drawings, with reference to the arrangement of the bricks with respect to the water circulating tubes and the firebox side sheets, the grooves or seats 45 are provided in the side edges of the bricks extending longitudinally of the combustion chamber.

In Figures 6 to 9 inclusive of the drawings I have illustrated an alternative embodiment of the invention, wherein each brick instead of being provided with a convex bottom face is formed with a flat or plane surface 41′. The medial portion of the upper surface of the brick is also flat and disposed in a plane parallel with the bottom face 41′, as indicated at 42′. The under portions of this upper surface of the brick are convex as at 42ᵃ. In this embodiment of the baffle brick, as in the preferred form above described, the transverse edge surfaces 48′ are also convex and the brick at each of its two opposite edges upon the underside thereof is formed with the transversely extending longitudinally curved concave seating surfaces 45′ for engagement upon the supports.

Figure 6:
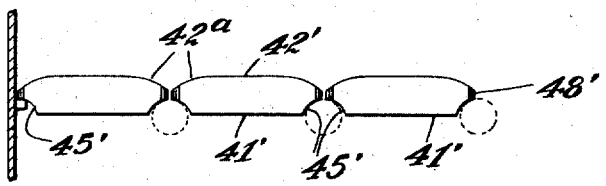
Figure 6 is a view similar to Figure 2 illustrating an alternative form of the arch wall bricks or units.
Figure 7:
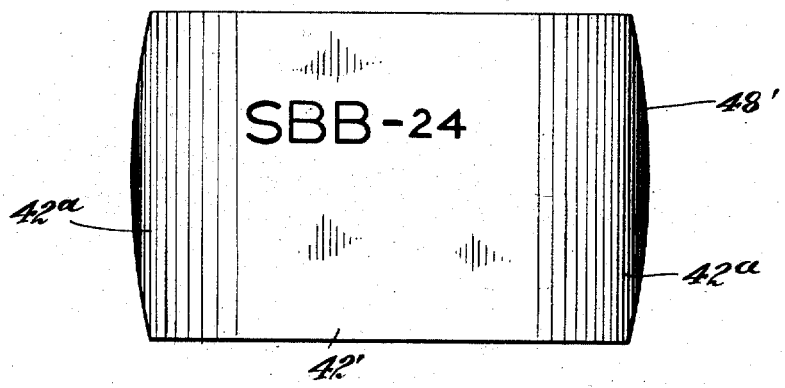
Figure 7 is a detail plan view of one of the bricks shown in Figure 6.
Figure 8:
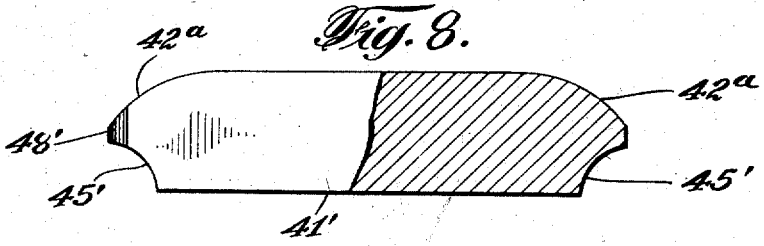
Figure 8 is a view similar to Figure 4 showing one of the bricks on an enlarged scale and partly in section.
Figure 9:
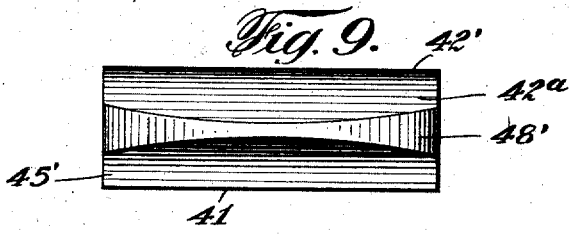
Figure 9 is an end elevation of the alternative form of brick.

When the bricks are arranged to form the baffle wall structure as shown in Figure 6 of the drawings, the flat or plane bottom faces 41′ thereof are disposed in a common horizontal plane which is substantially coincident with the horizontal plane of the axial centers of the supporting tubes. Of course the bricks in the outer rows are arranged with their concave surfaces 45′ resting upon the supporting lugs on the side sheets of the water legs. Since, in this alternative embodiment of the invention, the bricks for the side and intermediate rows of the baffle wall are all of identically the same form and construction, the same mold will serve for the protection of both the outer and intermediate brick and said brick of the side and intermediate rows will be freely interchangeable. This alternative construction of the brick provides a very serviceable and practical baffle wall structure, which in many instances might be desired in preference to a wall structure as first above described, wherein the bricks are of such form as to produce the individual channels for the flame and products of combustion along the underside of each water tube.

From the foregoing description considered in connection with the accompanying drawings, the construction and several advantages of my improved baffle brick will be clearly understood. In my issued patent above referred to I have illustrated numerous forms of bricks, all of which have a common essential characteristic, namely, the intermediate portions of the bricks project downwardly below the plane of the under surface of the water tubes so that when the bricks are assembled and the wall structure completed, there is produced distinct longitudinally extending channels along the underside of each water tube in and along which the gases and products of combustion will undeviatingly flow from one end of the arch wall to the other. It is obvious that a wall constructed of bricks of the form herein disclosed will possess the same desirable attribute. The intermediate portions of the bricks against which the flame and products of combustion immediately impinge, and by which they are directed towards the sides of the tubes is relatively thick so that the bricks will successfully withstand the high degree of heat to which they are subjected. The ends of the bricks being disposed upon the water circulating tubes, are less affected by the heat owing to the continuous cooling effect of the circulating water, and may, therefore, be comparatively thin. The bricks are, of course, arranged upon the tubes and supporting trunnions 50 so that the bricks constituting each longitudinal row have their opposed faces in close intimate contact with each other, thus producing a substantially imperforate or closed arch wall.

In the above description and the accompanying drawings I have illustrated and described an embodiment of the invention which has been found to be very satisfactory in actual service. The present improvement, may, however, be incorporated in bricks of the several forms disclosed in my issued patent, as well as in other alternative embodiments of the brick construction. Accordingly, it is to be understood that I reserve the privilege of resorting to all such legitimate changes in the form, construction and relative arrangement of the several parts as may be fairly embodied within the spirit and scope of the invention as claimed.

I claim:

1. In combination with a furnace combustion chamber having vertically disposed water legs at the sides thereof and spaced water tubes extending longitudinally through said combustion chamber; an arch wall consisting of baffle units positioned in a common horizontal plane extending substantially entirely across the combustion chamber between the vertically disposed water legs, spaced cylindrical supporting elements fixed to the water legs and projecting transversely therefrom, said units each having opposite edge portions of identically the same construction and provided on the lower face of each edge portion with a tube engaging surface adapted for close seating contact throughout said portions of the unit upon one of said tubes or for seating engagement upon the upper side of one of said supporting elements, and each of said edge portions of the baffle unit at the upper side thereof and above said tube engaging surface terminating in an edge face having a continuous convex curvature extending between the other opposite edges of the unit whereby the side units of the arch wall may be properly positioned upon said supporting elements and in close relation with the side sheets of the water legs.

2. In a locomotive fire box having vertically disposed water legs at the sides thereof, and spaced water tubes extending through the combustion chamber; an arch wall consisting of baffle bricks all of identically the same form and construction, supporting trunnions fixed to the side sheets of the vertically disposed water legs, each baffle brick having a transversely extending longitudinally concaved seating face on its under side at each of two opposite edges thereof for continuous contact of each seating face between the other opposite edges of the brick upon one of the water tubes, or for engagement with one of the trunnions, whereby said units may be arranged upon and between said tubes and between the outermost tubes and the side sheets in a common transverse horizontal plane to provide a substantially closed wall.

3. A baffle unit for locomotive fire box arches formed of refractory material and provided at each of two opposite edges on the under side thereof with a continuous uninterrupted surface extending across the entire edge of the unit for close seating engagement upon a water circulating tube extending through the fire box or upon a supporting trunnion fixed to one of the side sheets of the fire box, and each edge of said unit above said tube engaging surface having a convex end face describing a continuous arc extending between the other edge faces of the unit.

4. A side arch brick for locomotive arches having similarly formed ends, each end being formed with an undercut groove adapted to engage a supporting tube, and being formed with a curved surface extending from side to side and standing approximately perpendicular to the support engaging portion of the groove.

In testimony that I claim the foregoing as my invention, I have signed my name hereto.

JOHN E. MÜHLFELD.